H. Gross,
Making Wooden Pins.
Nº 15,763. Patented Sep. 23, 1856.
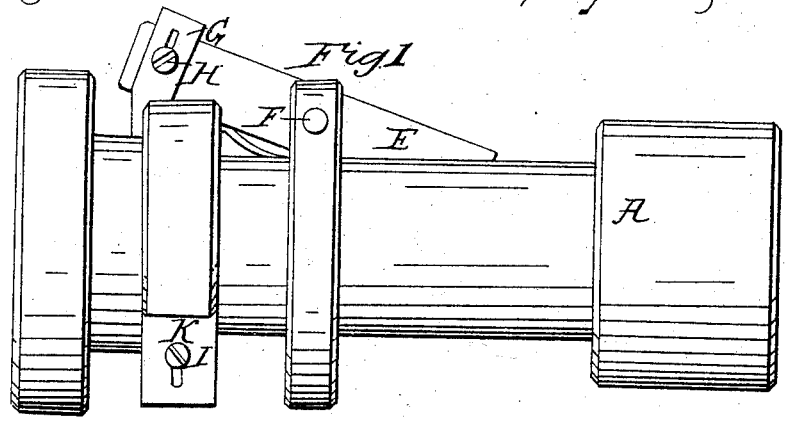
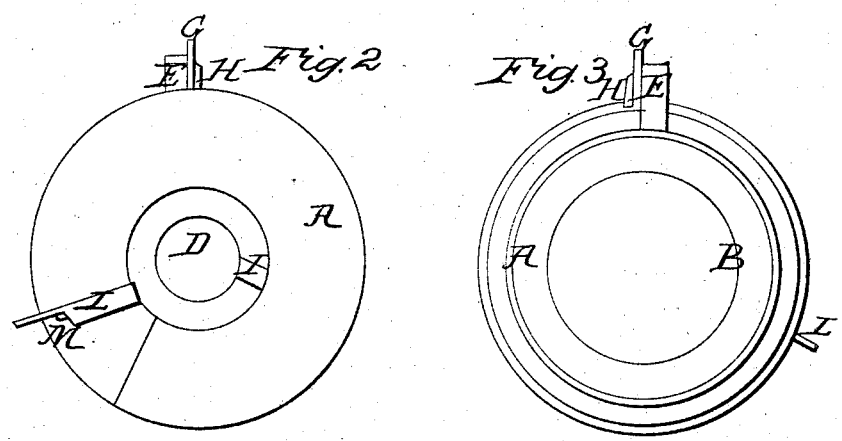
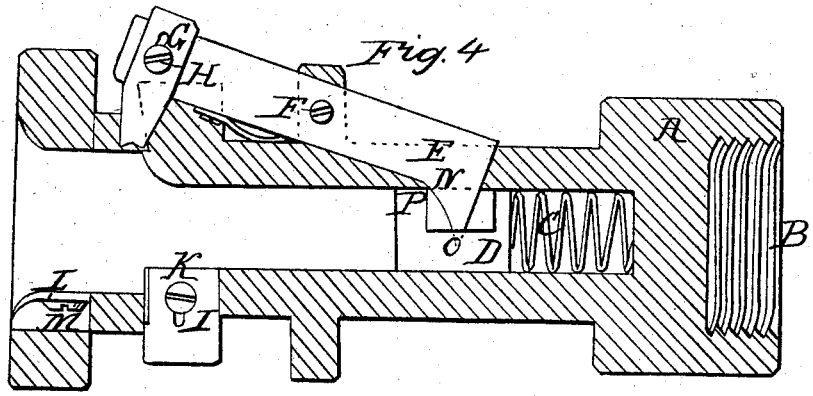

UNITED STATES PATENT OFFICE.

HENRY GROSS, OF TIFFIN, OHIO.

DEVICE IN MACHINES FOR MANUFACTURING BED-PINS.

Specification of Letters Patent No. 15,763, dated September 23, 1856.

*To all whom it may concern:*

Be it known that I, HENRY GROSS, of Tiffin, in the county of Seneca and State of Ohio, have invented a new and useful Improvement in Machines for Making Bedstead-Pins; and I do hereby declare that the following is a full and exact description thereof, reference being had to the model and accompanying drawing, making a part of this specification, in which—

Figure 1, is a side view of the cylinder in which the chisels are placed, and which is made of cast iron, with a screw at one end, by which it is attached to the lathe. Fig. 2 is an end view showing the opening into which the stick is forced when pins are being made. Fig. 3 is a view of the opposite end with a larger opening and screw thread by which it is attached to the lathe as named above. Fig. 4, is a longitudinal vertical view, showing the inside of the machine.

The same letters refer to like parts.

"A" is the cylinder "B" the screw thread for attachment—"C" spiral spring—"D" the follower—"E" lever, "F" pivot or pin upon which the lever works, "G" the chisel for cutting the head of the bedstead pin in proper shape and also cutting the pin off when completed.

"*i*" and "L" are two chisels near the outer end of the machine as seen in Fig. 2, the first one at "L" cutting the stick to the diameter of the head of the pin, the second to the size of the shaft of the pin, and when the desired length is attained (and which is fixed by the machine itself) the inner end of the pin comes in contact with the follower "D" which plays back and forth in the cylinder, and in which follower a slot is made receiving the curved end of the lever "E" as seen in Fig. 4, and by passing the pin or stick inward against the follower, the latter acts upon the curved end of the lever at the point "P" and forces it upward until the point "O" Fig. 4, is near the top of the slot in the follower, at the same time the opposite end of the lever with the chisel is depressed and brought down upon the stick and the head of the pin formed and the pin cut off by the same chisel, which pin when completed is thrown out of the machine by the action of the spiral spring "C."

The shape of the head of the pin is determined by the curve at the end of the lever at "N" as the follower and pin pass farther into the machine while the lever is being forced upward giving the head of the pin an oval shape by means of the chisel at the opposite end of the lever.

This machine is believed to be superior to all others used for the same purpose especially for the reason, that the pin is turned smoothly in all its parts the head formed in good shape, and the pin cut off from the stick, and entirely completed in the one process.

I disclaim the throwing out of the finished pin by a spring, and the employment of a movable cutter for forming the head, when a distinct and separate operation is required to bring it into action; as in W. McBride's patent of Feby 28th 1854. But

I claim—

Fixing the head forming V cutter to a lever operated by the longitudinal movement of the pin, as described; whereby but one hand of the operator is required for forming the entire pin.

HENRY GROSS.

Witnesses:
R. G. PENNINGTON,
JESSE H. SEIDY.